United States Patent [19]

Takaoka et al.

[11] 4,320,812
[45] Mar. 23, 1982

[54] FLOW CONTROL SYSTEM FOR USE IN POWER STEERING APPARATUS

[75] Inventors: Shuji Takaoka, Osaka; Shoji Fujimoto, Kagawa, both of Japan

[73] Assignee: Koyo Seiko Company Limited, Osaka, Japan

[21] Appl. No.: 100,249

[22] Filed: Dec. 3, 1979

[30] Foreign Application Priority Data

Dec. 5, 1978 [JP] Japan ............................ 53-167828[U]

[51] Int. Cl.³ ................................................ B62D 5/08
[52] U.S. Cl. ........................................ 180/143; 91/458
[58] Field of Search ..................... 180/143, 142, 141; 91/458

[56] References Cited

U.S. PATENT DOCUMENTS

3,744,515  7/1973  Inoue ................................. 180/143
3,924,705  12/1975  Sugisawa ........................... 180/143

Primary Examiner—John P. Silverstrim
Attorney, Agent, or Firm—Mason, Fenwick & Lawrence

[57] ABSTRACT

A flow control system for use in a power steering apparatus including a fluid cylinder for amplifying the manual steering torque and a control valve associated therewith. The flow control system is installed in a pressure fluid feed line which feeds fluid from a hydraulic pump to the fluid cylinder via the control valve. The system comprises a parallel combination of a fixed restrictor and a variable restrictor, and a vehicle speed response control device comprising a stepping motor for changing the amount of restriction of the variable restrictor by rotating the restrictor by a specific angle, a vehicle speed sensor for producing an electric signal in response to the increase and decrease of the vehicle speed, and a stepping motor control device for controlling the angle of rotation of the stepping motor by means of the electric signal from the sensor to control the amount of restriction of the variable restrictor so as to control the flow rate of pressure fluid to the control valve and fluid cylinder, thereby improving the stability of steering.

5 Claims, 12 Drawing Figures

FLOW CONTROL SYSTEM FOR USE IN POWER STEERING APPARATUS

BACKGROUND OF THE INVENTION

The present invention relates to a flow control system for use in a power steering apparatus, and more particularly it relates to a system for use in a power steering apparatus including a fluid cylinder for amplifying the manual steering torque and a control valve associated therewith, said system serving to control the flow rate of pressure fluid being fed from a hydraulic pump to the fluid cylinder via the control valve, in response to the vehicle speed.

Figure 1:
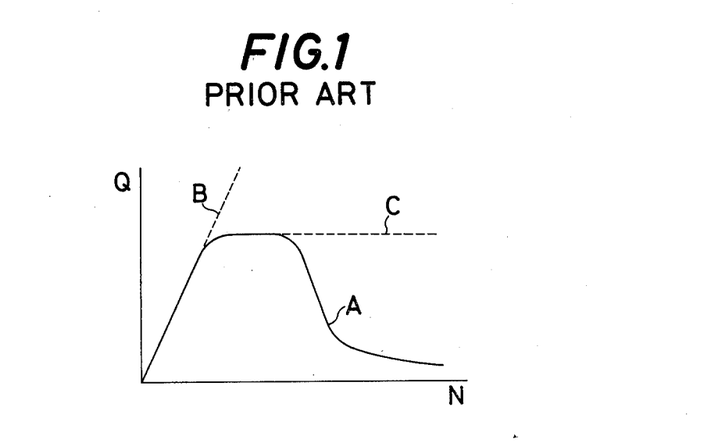
FIG. 1 is a graph showing the flow rate characteristics of various hydraulic pumps.

It is preferable for a power steering apparatus to be capable of decreasing its steering torque amplifying function when the vehicle is running at high speed. As an example typical of such function, an arrangement is known which uses a pump, usually called a dropping pump, which provides a flow rate characteristic indicated by a curve A in FIG. 1. (In addition, a curve B in FIG. 1 indicates the characteristic of a proportional discharge pump wherein the discharge rate Q increases in proportion as the pump rpm N increases, and a curve C indicates the characteristic of a constant discharge pump wherein the discharge rate increases linearly until a certain value of the pump rmp is reached, whereupon the discharge rate Q becomes constant even if the rpm N increases.) The dropping pump has a function such that the discharge rate increases linearly until a certain value of the rpm is reached, whereupon the discharge rate becomes constant until another certain value of the rpm is reached, and then the discharge rate Q decreases with increasing rpm N.

However, since such pump is driven directly by the rotation of the engine, there is a drawback that the discharge rate Q varies with the engine rpm and does not necessarily agree with the vehicle speed.

With the object of varying the flow rate with the vehicle speed, there have been proposed various flow control systems, as found, for example, in Japanese Patent Publication No. 39529/1977, and Japanese Patent Disclosure Nos. 30039/1972 and 41326/1977.

These proposals may be classified into two types, one in which when the vehicle speed reaches a certain value, the flow control valve is on-off operated, and the other in which the flow rate is continuously varied in accordance with the vehicle speed. In the former type, the stepwise changes in the flow rate by said one-off operation are so large that such sharp changes can give the driver an uneasy feeling, and in the latter type, the construction of the control valve is extremely complicated in order to obtain the predetermined flow rate characteristic and there are many problems in practice. Further, in either case, little or no consideration has been given to safety measures against rare faults or to measures against pulsations of pressure fluid.

As for methods of electrically effecting the flow rate control of the power steering apparatus, mention may be made of Japanese Patent Publication No. 3142/1976 wherein a vehicle speed signal (frequency) is converted into a change in current and changes in the attraction of an exciting coil produced by increases and decreases in current are utilized, and Japanese Patent Publication No. 27887/1977 and Japanese Utility Model Publication No. 6828/1976 wherein the vehicle speed is converted into a voltage by a tachometer generator and increases and decreases in voltage are used to actuate a plurality of solenoids to control the flow rate. In these methods, however, the change of the steering characteristics which should attend the change of the type and specification of the vehicle is difficult to make, detracting from versatility, and despite the fact the amount of control fluid is stepwise changed, the number of control stages is limited by the weight and the space available, so that changes in the vehicle speed during run cause sharp changes in the steering torque, thus giving the driver an uneasy feeling. Moreover, in each of these methods, little consideration has been given to a measure for a fail-safe feature against rare faults or to a measure for prevention of mulfunction in steering, and even if the electric circuitry is relatively simple, the mechanism associated with the valve section is complicated and the weight is increased, adding to the cost.

SUMMARY OF THE INVENTION

An object of the present invention is to provide a flow control system for use in a power steering apparatus including a fluid cylinder for amplifying the manual steering torque and a control valve associated therewith, said system being adapted to control the flow rate of pressure fluid being fed to the fluid cylinder via said control valve, in accordance with increases and decreases in the vehicle speed, thereby improving the feeling of steering when the vehicle is running.

Another object of the invention is to provide a flow control system in which sufficient consideration is given to a measure for a fail-safe feature against rare faults and to a measure for prevention of mulfunction.

A further object of the invention is to provide a flow control system which is adapted to be electrically powered and which provides various flow rate characteristics and facilitates the setting of such flow rate characteristics.

Still a further object of the invention is to eliminate the drawbacks of the flow control valve including noise and heat generation and power loss.

The flow control system of the present invention comprises a parallel combination of a fixed restrictor and a variable restrictor. The pressure fluid being fed from a hydraulic pump flows through the fixed and variable restrictors and these branch currents meet together and enter the control valve for the fluid cylinder.

The variable restrictor has its amount of restiction controlled by a stepping motor. The stepping motor has its angle of rotation electrically controlled in response to the vehicle speed.

The device for controlling the stepping motor has the function of forcing the stepping motor to return to the original position for flow control by means of an original position restore circuit, so that it is possible to avoid mulfunction during steering. The stepping motor control device comprises Schmitt circuits in respective stages associated with the rotative angle of the stepping motor, the arrangement being such that by adjusting the preset voltages for the Schmitt circuits, it is possible to change the flow rate versus vehicle speed characteristic as desired. Therefore, it is possible to provide a specific characteristic most suitable for a specific vehicle type and specification.

Further, since a series of operations extending from the detection of the vehicle speed to the control of the flow control valve are electrically performed, it is easy to take a measure for a fail-safe feature against rare faults and the invention can be easily embodied without the need of remodeling the vehicle and the pump for the power steering apparatus.

Moreover, since the construction of the flow control valve used in the invention is simple as compared with the one used in the conventional system, the flow control system can be easily made light in weight.

In addition, by employing the present control system in a vehicle and additionally detecting other conditions imposed on the steering torque including load variations and steering angle by various sensors, it is possible to develop a further advanced system. Even if the electronic control of and the use of microcomputers in automobiles are further encouraged, it is possible to incorporate the present invention therein to thereby save the cost.

Further, according to the invention, since the rate of flow to the control valve is controlled in accordance with the vehicle speed by controlling the amount of restriction of the variable restrictor by the stepping motor, sufficient power amplification is effected to mitigate the requirement for the driver's high steering torque during the manipulation of the steering wheel with the vehicle stopped or during the low speed running of the vehicle, while during the high speed running of the vehicle the power amplification is decreased to assure stabilized steering performance free from the excessive turning and fluctuation of the steering wheel.

Further, the invention does not require the provision of a special pump for the power steering apparatus and allows the use of a common rpm proportion type pump, thus achieving the saving of cost. By installing in the system a bypass section and a relief section for returning excess pressure fluid to the oil tank, it is possible to use the respective circuits in common, and the system can be made small in size and compact and inexpensive.

Other objects and features of the invention will become more apparent from the following description.

DESCRIPTION OF THE PREFERRED EMBODIMENT

Figure 2:
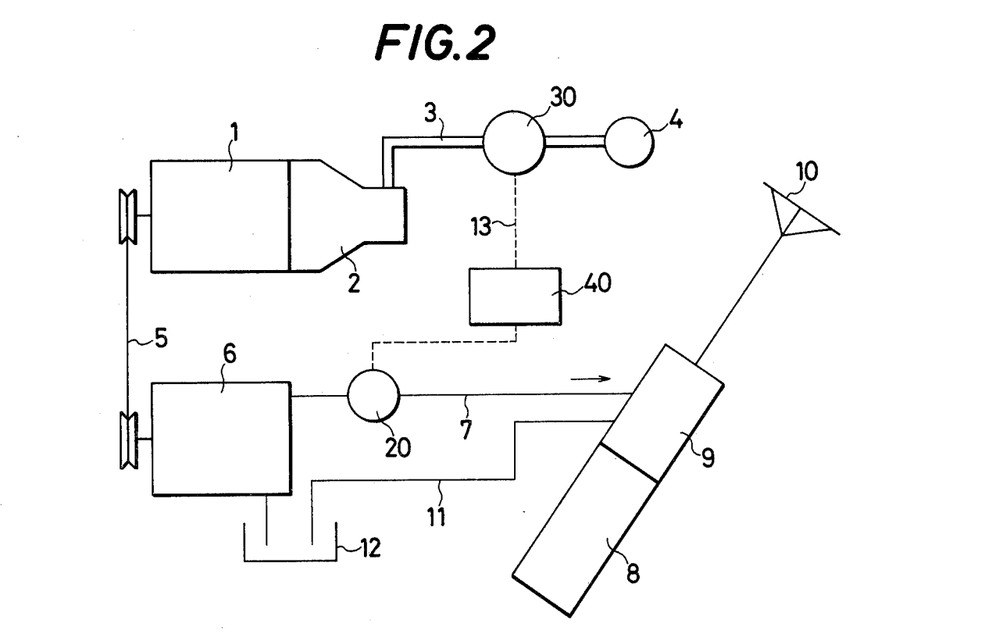
FIG. 2 is a chart of a control system showing an embodiment of the invention.

In the control system diagram shown in FIG. 2, the numeral 1 designates an automobile engine, and 2 designates a transmission whose output rotative speed, or the vehicle speed, is transmitted to a speedometer 4 through a flexible shaft 3. Pressure fluid from a hydraulic pump 6 driven by the engine 1 through a belt 5 is fed to a control valve 9 for a fluid cylinder 8 through a pressure fluid feed line 7. The control and change of the direction of feed of the pressure fluid to the fluid cylinder 8 (the steering direction) are effected by manipulating a steering wheel 10, the fluid discharged from the control valve 9 being returned to an oil tank 12 via a return circuit 11. As is known in the art, the fluid cylinder 8 is actuated by the pressure fluid from said control valve to operate the steering mechanism of the automobile.

Figure 3:
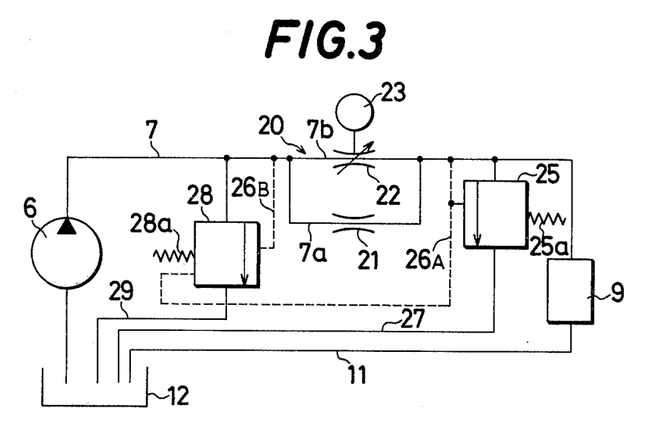
FIG. 3 shows an example of a hydraulic circuit including a flow control system.

The arrangement described above is the known control system of the power steering apparatus. Installed in a pressure fluid feed line 7 extending from said hydraulic pump 6 to the control valve 9 is a flow control system, as shown in FIG. 3. This system comprises a flow control valve 20 including a parallel combination of a fixed restrictor 21 and a variable restrictor 22 for regulating the flow rate of the pressure fluid, a stepping motor 23 for varying the amount of restriction of said variable restrictor 22, a vehicle speed sensor for producing an electric signal corresponding to the rotative speed of the output shaft of said transmission 2, namely the vehicle speed, and a stepping motor control device 40 adapted to be actuated by the electric signal from said vehicle speed sensor 30 to control the angle of rotation of said stepping motor 23. Indicated by the numeral 13 is an electric circuit therefor.

The vehicle speed sensor 30 is connected, for example, to a flexible shaft 3 at either end or intermediate between the ends thereof which connects the speedometer 4 and the output shaft of the transmission 2 and may be any known sensor, so long as it will produce an electric signal proportional to the vehicle speed.

Figures 10, 11:
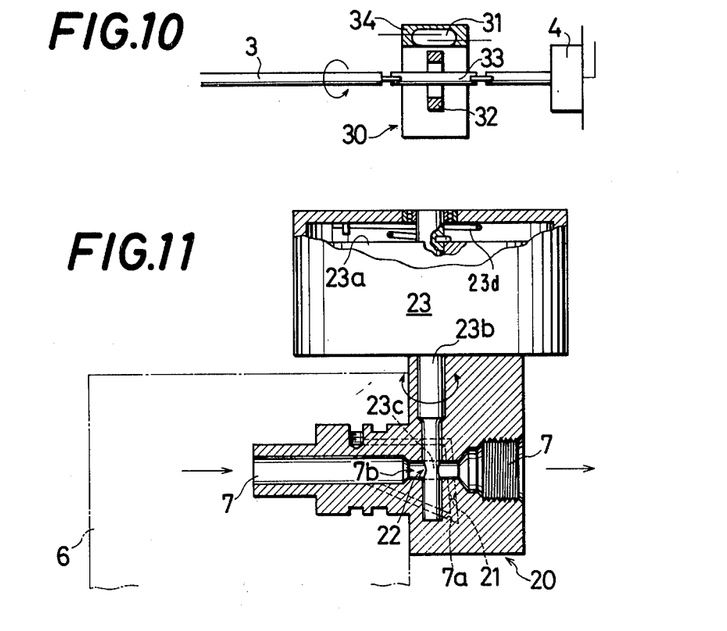
FIG. 10 is a sectional view of an example of a vehicle speed sensor.
FIG. 11 is a sectional view of an example of a variable restriction mechanism.

FIG. 10 shows an example of the vehicle speed sensor using a reed switch 31, comprising a rotary shaft 33 which rotates in proportion to the vehicle speed, and a suitable number of magnets 32 attached to the periphery of said rotary shaft, said reed switch 31 being installed in a housing 34 at a position close to the path of movement of the magnets 32 which is caused by the rotation of the shaft 33, the arrangement being such that a suitable number of pulses (two pulses, in the illustration) are produced at each revolution of the shaft 33. This number of the pulses, namely, the number of the magnets 32, may be suitably determined at the time of designing the stepping motor control device 40 to be later described.

The stepping motor control device 40 is a control device which receives electric signals from the vehicle speed sensor 30 to control the angle of rotation of the stepping motor 23 to be later described, thereby achieving the desired flow characteristic of the variable restrictor 22.

Figure 4:
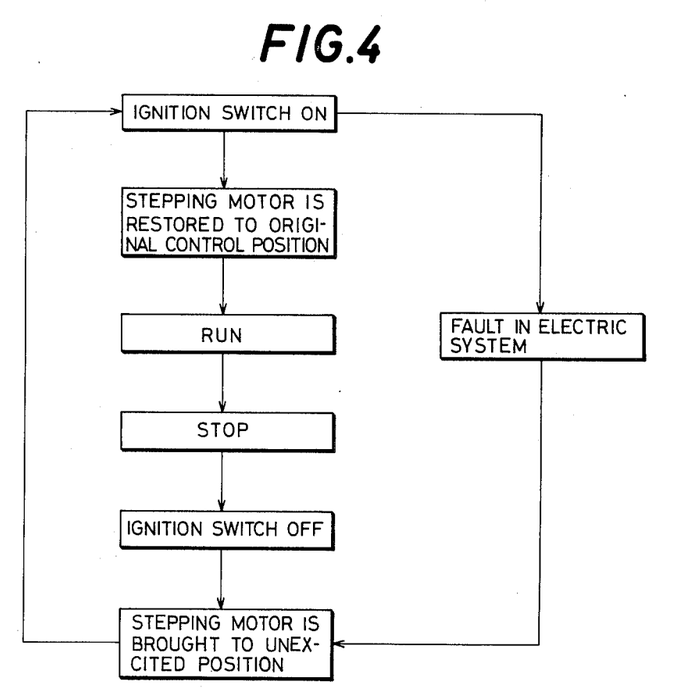
FIG. 4 is a flow chart showing a control system according to the invention.

FIG. 4 shows a control system for the stepping motor 23. When the ignition switch is turned on to bring the vehicle into the start position, the rotor of the stepping motor, which has been positioned at its final stop position, unexcited, (on the safety side) by mechanical positioning means such as spring, is returned to the original position for flow control by the action of an original position restore circuit. As the vehicle starts to run, the stepping motor control device receives pulse signals proportional to the vehicle speed from the vehicle speed sensor to rotate the rotor of the stepping motor by a fixed angle in accordance with the vehicle speed, and the control of flow of the operating oil by changing the area of opening of a hole formed in a portion of the support shaft of the rotor communicating with the hydraulic circuit. When the vehicle is stopped and the ignition switch is turned off, the stepping motor becomes unexcited and the positioning means such as spring mechanically rotates the rotor back to its final stop position where it is stopped. In said operation, the final stop position of the rotor may be made to correspond to the final stop position of the variable restrictor. Even if a fault occurs in the electric system, since the stepping motor is rendered unexcited as in the case described above, the rotor can be stopped at its final stop position by said positioning means, thus decreasing the discharge rate, so that the safety for steering can be secured.

The control operation will now be described with reference to FIGS. 5 through 9 showing a block diagram of the stepping motor control device and waveforms produced in various portions of said block diagram.

Figure 5:
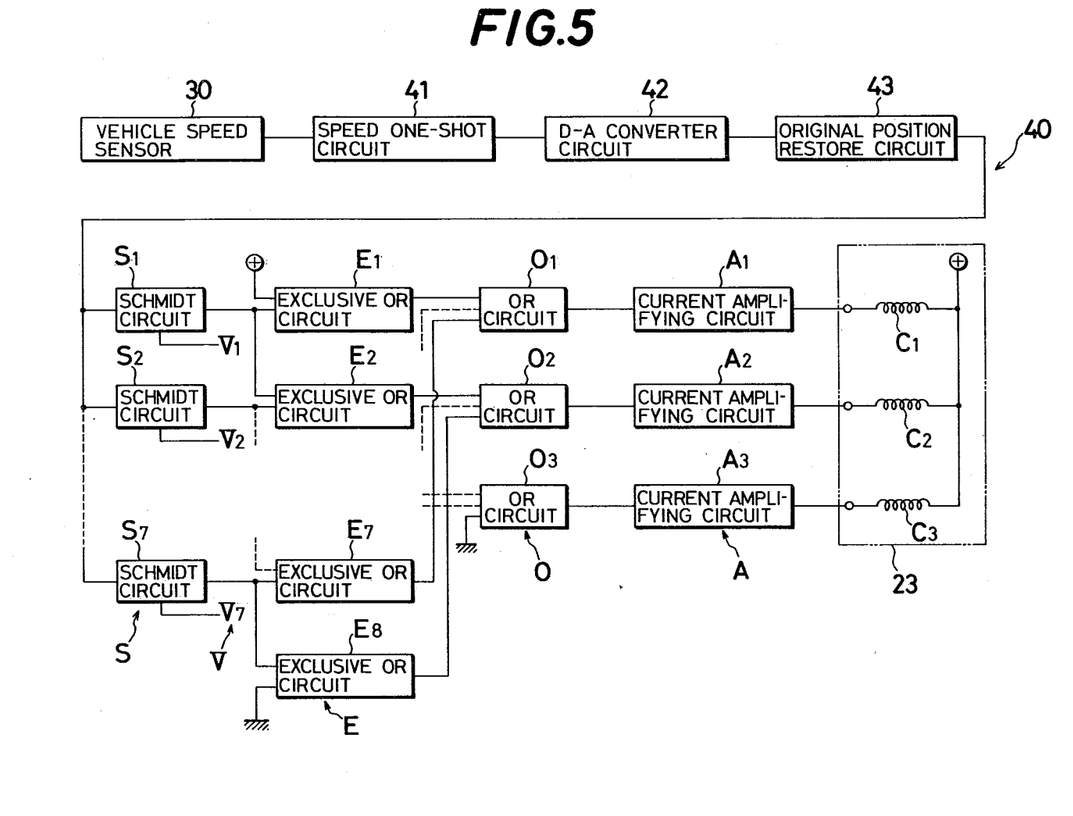
FIG. 5 is a block diagram showing a stepping motor control device.

Pulse signals $30a$ from the vehicle sensor 30 which are generated on electromagnetic or optical principles are fed to a one-shot circuit 41 where they are shaped to have a constant pulse width as shown at $30b$. The output signal $30b$ from the one-shot circuit 41 is converted into an analog output voltage $30c$ by a digital-analog converter circuit (hereinafter referred to as D-A converter circuit) 42, said output voltage being fed via an original position restore circuit 43 to a plurality of multiple stage Schmitt circuits $S_1, S_2 \ldots S_7$ which are connected to said circuit 43.

Figure 7:
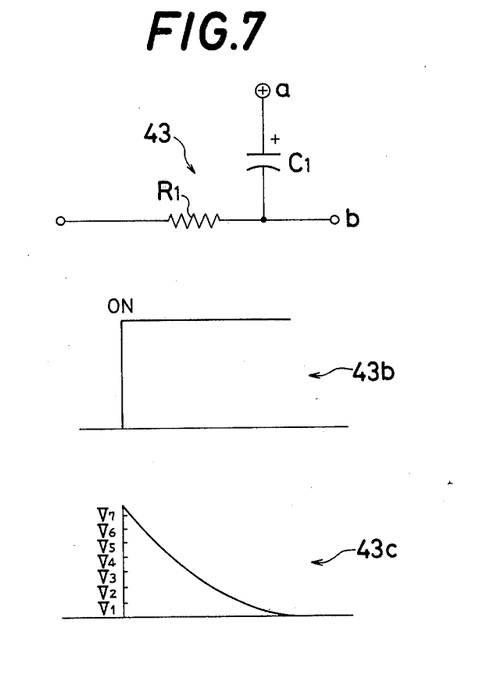
FIG. 7 is a diagram showing an original position restore circuit and also illustrating the operation thereof.

The original position restore circuit 43, as shown in FIG. 7, is a differentiating circuit comprising a resistor $R_1$ and a capacitor $C_1$ and arranged so that the rising voltage waveform $43b$ produced when the power is turned on is attenuated with a time constant determined by the resistor $R_1$ and capacitor $C_1$, thereby forcing the rotor 23 of the stepping motor to move from the predetermined final stop position to the original position for flow control. Thus, the power source voltage $43b$ imposed at a point a in the original position restore circuit 43 of FIG. 7 by turning on the power appears as a differentiated waveform $43c$ at a point b connected to the Schmitt circuit assembly S. Designated at $V_7, V_6 \ldots V_1$ are preset voltages on the 7th through 1st stage Schmitt circuits $S_7, S_6 \ldots S_1$. When the differentiated waveform $54c$ is transferred to the Schmitt circuit assembly S, the Schmitt circuits $S_7, S_6 \ldots S_1$ successively deliver outputs, so that the rotor of the stepping motor 23 held at the final stop position by the positioning means such as spring is forcibly returned to said original position, thereby assuring the original position of said rotor at the time of the start of the vehicle and preventing mulfunction during steering.

The D-A converted analog output $30c$ is compared with the preset voltages $V_1, V_2 \ldots V_7$ in the Schmitt circuit assembly S, and when a voltage determined by the preset voltages $V_1, V_2 \ldots V_7$ and the hysteresis characteristic of the Schmitt circuit assembly S is reached, outputs $30d$ are delivered from the 1st through 7th stage Schmitt circuits $S_1, S_2 \ldots S_7$. The number of stages of the Schmitt circuit assembly S is related to the number of steps of the stepping motor 23 and may be optionally determined on the basis of the steering characteristic. In this embodiment of the invention, 7 stages are provided for the convenience of the circuit design. (However, the number of steps of the stepping motor is 8 because of a distribution circuit to be later described.)

Figure 8:
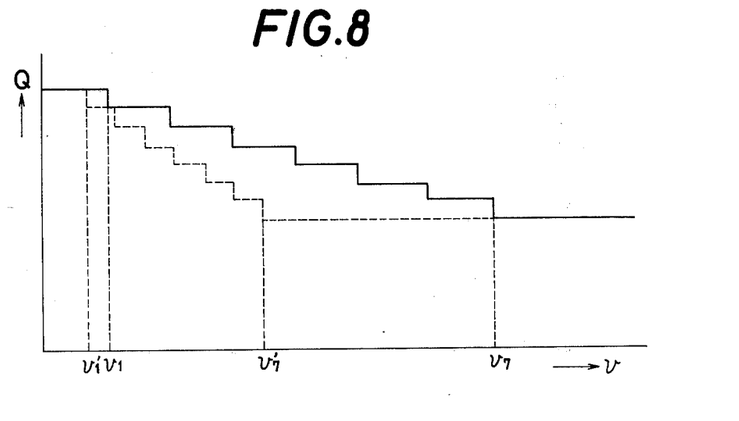
FIG. 8 illustrates the setting of flow rate versus vehicle speed characteristics.

The change of the preset voltages $V_1, V_2 \ldots V_7$ in the Schmitt assembly S, for changing the vehicle speeds corresponding to the D-A conversion circuit outputs to $v'_1, v'_2 \ldots v'_7$, can be made by setting afresh the flow rate Q versus vehicle speed v characteristic, for example from one shown in solid lines to one shown in broken lines in FIG. 8, by changing the preset voltages in the Schmitt circuit assembly.

Figure 6:
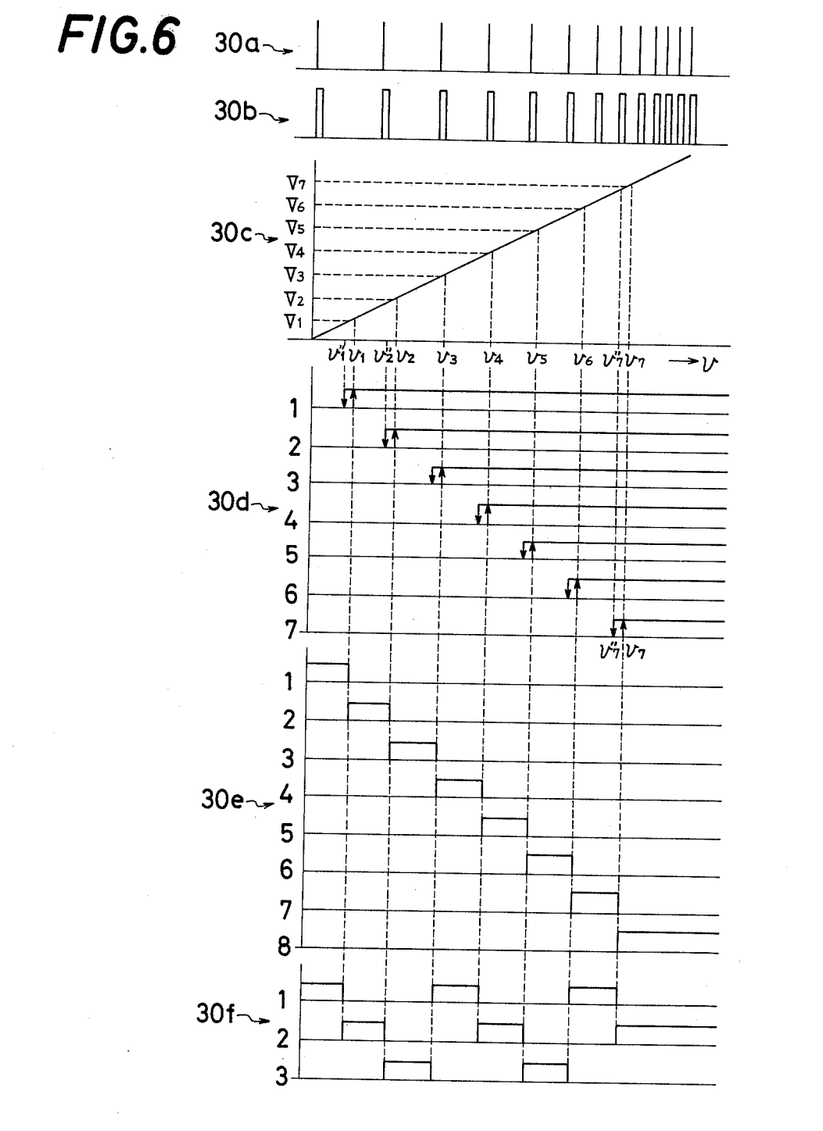
FIG. 6 illustrates the operation of the stepping motor control device.
Figure 9:
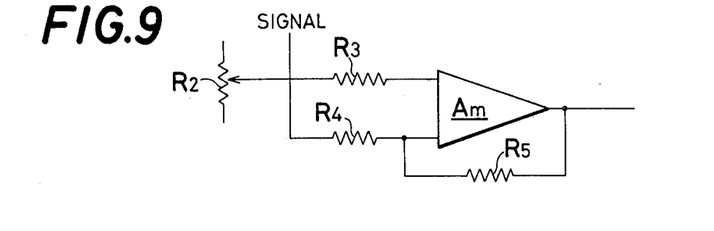
FIG. 9 shows an example of a Schimitt circuit arrangement.

Since the Schmitt circuits $S_1, S_2 \ldots S_7$ in the respective stages are each composed of a combination of an operational amplifier Am and resistors $R_2$-$R_5$, as shown in FIG. 9, the hysteresis characteristics to be imparted to the Schmitt circuits $S_1, S_2 \ldots S_7$ can be determined by the potential division ratio of the resistors $R_4$ and $R_5$. Therefore, if the potential division ratio of said resistors $R_4$ and $R_5$ is changed so that the vehicle speeds (frequencies) at which the Schmitt circuit Assembly S is turned on and off may be, for example, $v''_7$ in the 7th stage, as shown in FIG. 6, and the hysteresis width $(v_7-v''_7)$ is optionally determined, then the chattering of the stepping motor control device can be prevented and the stabilized operation of the stepping motor 23 can be achieved.

The outputs from the Schmitt circuits $S_1, S_2 \ldots S_7$ in the respective stages are applied to the stepping motor 23 through logical circuits to be described below.

The outputs from the Schmitt circuits $S_1, S_2 \ldots S_7$ in the respective stages are transferred to corresponding exclusive-OR circuits $E_1, E_2 \ldots E_7$ and also to the respective one-stage higher exclusive-OR circuits $E_2, E_3 \ldots E_8$ so that outputs from the exclusive-OR circuits $E_1, E_2 \ldots E_8$ in the respective stages are as shown by $30e$. Since the exclusive-OR circuits $E_1, E_2 \ldots E_8$ are successively distributively connected to three OR circuits $O_1, O_2$ and $O_3$, the distributive outputs from the OR circuits $O_1, O_2$ and $O_3$ are as shown by $30f$ and amplified by current amplifying circuits $A_1, A_2$ and $A_3$ to excite the coils $C_1, C_2$ and $C_3$, respectively. As a result, the rotor $23a$ of the stepping motor 23 shown in FIG. 11 is rotated by an angle corresponding to the vehicle speed, and by changing the area of the hole $23c$ in a portion of the rotor shaft $23b$ communicating with the hydraulic circuit 7, it is possible to control the flow rate which influences changes in the steering torque.

FIG. 11 shows an example of a combination of a stepping motor 23 and a flow control valve 20 assembled integrally with a hydraulic pump 6. Designated at $23d$ is a spring serving as mechanical positioning means for returning the rotor to the final stop position, said spring being disposed between the case of the stepping motor 23 and the rotor $23a$, one end of said spring being fixed to the case and the other end to the rotor $23a$. Designated at 21 and 22 are a fixed restrictor and a variable restrictor, respectively, which are installed in the hydraulic circuit 7 of FIG. 3, and operate to control the flow rate of the pressure fluid from the hydraulic pump 6 to the control valve 9, but the changes in the flow rate due to the vehicle speed are controlled by adjusting the variable restrictor 22 by the rotation of the rotor $23b$. The numeral 25 designates a relief valve for pressure compensation associated with the control valve 9. The relief valve operates by detecting the pressure in the control valve 9 by means of a branch circuit 26A disposed downstream of the flow control valve 20 in the hydraulic circuit 20. If it detects an excessive pressure, it is actuated against the force of a spring 25a to return the excess pressure fluid to the oil tank 12 via a circuit 29. The numeral 28 designates a flow control valve adapted to be actuated when the discharge rate of the pump 6 becomes excessive, so as to return the excess pressure fluid to the oil tank 12, said flow control valve being actuated by the difference between the pressure in a branch circuit 26B disposed between the hydraulic pump 6 and the flow control valve 20 and the force of a spring 28a plus the pressure in the circuit 26A.

Figure 12:
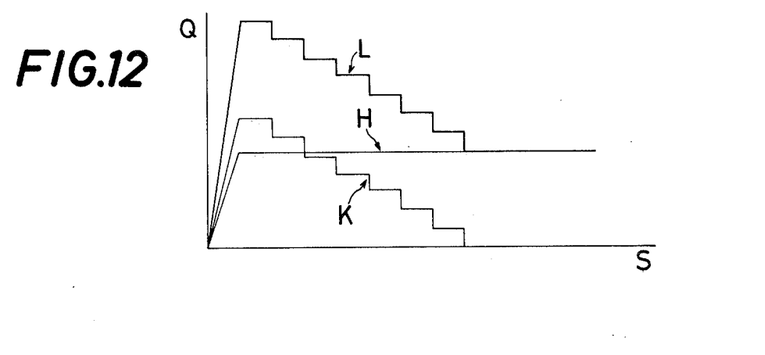
FIG. 12 illustrates flow rate versus vehicle speed characteristics.

With the flow control valve 20, it is possible to obtain a flow rate characteristic (Q; flow rate, S; vehicle speed) shown at L in FIG. 12.

The pressure fluid being discharged from the hydraulic pump 6 is divided between the fixed and variable restrictors 21 and 22 and then the branch currents meet together to be fed to the control valve 9. In this case, the rate of flow through the fixed resistor 21 is fixed so that it has a characteristic H shown in FIG. 12, while the rate of flow through the variable restrictor 22 is preset so that when fully opened (the amount of restriction being zero), it has its maximum value defined as the maximum value of a characteristic K in FIG. 12. Thus, this means that the maximum value for the rate of total flow (characteristic L) fed to the control valve 9 after the branch currents meet together has been determined. In addition, when the rate of flow from the hydraulic pump 6 exceeds said maximum value, the flow control valve 28 is actuated as described above to return the excess pressure fluid to the oil tank 12, while the side associated with the control valve 9 effects pressure compensation by the relief valve 25.

The variable restrictor 22 has its amount of restriction controlled by the rotation of the stepping motor 23, and the angle of rotation of the rotor 23a of the stepping motor is controlled by the vehicle speed through the stepping motor control device 40, as described above. Therefore, the flow rate characteristic of the variable restrictor 22 can be freely changed and set by merely adjusting the stepping motor control device 40 as shown, for example, at K in FIG. 12.

Therefore, pressure fluid is fed to the control valve 9 by the total flow characteristic L comprising the flow characteristic H of the fixed restrictor 21 and the flow characteristic K of the variable restrictor 22, in such a manner that the higher the vehicle speed, the lower the rate of flow to the control valve 9, thereby giving the driver a proper feeling of steering during high speed running and improving the feeling of safety.

In addition, in the variable throttle valve 20, the hole 23c in the rotor shaft 23b and the fluid passage 7b formed in the housing are not limited in shape to a simple circle. They may have any desired cross-sectional shape, for example, an ellipse or a rectangle. Further, the rotor shaft 23b may be circumferentially provided with a so-called Archimedes groove. In this way, too various flow characteristics may be obtained. The characteristics K and L in FIG. 12 are shown, for convenience, as making all changes from complete opening to complete closure of the restrictor in 8 steps, but this is not particularly important. In practice, this should be determined from the consideration of the actual feeling at the driver's seat, problems in the design of the stepping motor control device, etc.

While FIG. 11 illustrates an embodiment wherein the stepping motor 23, flow control valve 20 and hydraulic pump 6 are assembled in a unit, it goes without saying that they may be separated from each other. Further, the fixed and variable restrictors may, of course, be separately constructed.

What is claimed is:

1. A flow control system for use in a power steering apparatus including a fluid cylinder for amplifying the manual steering torque and a control valve associated therewith, a hydraulic pump for feeding pressure fluid to said fluid cylinder via said control valve, a pressure fluid feed line extending from said hydraulic pump to said control valve, a fixed restrictor for fixing a flow rate installed in said pressure fluid feed line, a variable restrictor for providing a variable flow rate installed in said pressure fluid feed line in parallel relation to said fixed restrictor, and vehicle speed-responsive control means for controlling the amount of restriction of said variable restrictor in response to the increase and decrease of the vehicle speed, said vehicle speed-responsive control means comprising:

a stepping motor for changing the amount of restriction of said variable restrictor by rotating said restrictor by a specific angle, a vehicle speed sensor which produces electric signals corresponding to the vehicle speed, and a stepping motor control device for controlling the angle of rotation of said stepping motor by actuation of exciting coils thereof by means of the electric signals from said sensor.

2. A flow control system as set forth in claim 1, wherein the rotor shaft of said stepping motor forms said variable restrictor in connection with said pressure fluid feed line.

3. A flow control system as set forth in claim 1, wherein said stepping motor comprises positioning means for mechanically positioning the rotor of the stepping motor at its final stop position in an unexcited state, and a stepping motor control circuit for controlling the angle of rotation of the stepping motor, and wherein said stepping motor control circuit comprises a plurality of Schmitt circuits adapted to receive electric signals from the vehicle sensor and having mutually different optional voltages preset thereon, an original position restore circuit whereby at the start of the vehicle, the rotor of the stepping motor is restored from said final stop position to the original position for control, and logic circuits adapted to be operated by the outputs from said Schmitt circuits to apply exciting currents to the exciting coils of the stepping motor.

4. A flow control system as set forth in claim 3, wherein said original position restore circuit is a differentiating circuit comprising a resistor and a capacitor.

5. A flow control system as set forth in claim 3, wherein said positioning means for mechanically positioning the rotor of said stepping motor at its final stop position in an unexcited state comprises a spring having one end thereof fixed to the case of the stepping motor and the other end to the rotor of the stepping motor.

* * * * *